(12) United States Patent
Kodaypak

(10) Patent No.: US 9,781,259 B1
(45) Date of Patent: Oct. 3, 2017

(54) METHOD AND APPARATUS FOR ASSET LOCATION TRACKING IN A COMMUNICATION NETWORK

(71) Applicant: AT&T INTELLECTUAL PROPERTY I, L.P., Atlanta, GA (US)

(72) Inventor: Rajendra Prasad Kodaypak, Sammamish, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/221,221

(22) Filed: Jul. 27, 2016

(51) Int. Cl.
*H04W 24/00* (2009.01)
*H04M 3/42* (2006.01)
(Continued)

(52) U.S. Cl.
CPC ........ *H04M 3/42357* (2013.01); *H04L 67/02* (2013.01); *H04W 4/023* (2013.01); *H04W 8/24* (2013.01)

(58) Field of Classification Search
CPC ....... H04W 64/00; H04W 4/02; H04W 48/12; H04W 4/20; G01S 5/0242; G01S 5/021;
(Continued)

(56) References Cited

U.S. PATENT DOCUMENTS 8,103,287 B2   1/2012 Mueck et al.
8,548,492 B2  10/2013 Islam et al.
(Continued)

FOREIGN PATENT DOCUMENTS

CN   102148736 A   8/2011
CN   102164271 A   8/2011
(Continued)

OTHER PUBLICATIONS

Fujdiak, Radek, "In-Depth Analysis of Smart City in Modern Age", http://www.academia.edu/download/45272152/EEICT2016.pdf, Disclosing locating new equipment and determining location of existing devices (p. 574 for location in the group of characteristics)., 2016.

(Continued)

*Primary Examiner* — Kwasi Karikari
(74) *Attorney, Agent, or Firm* — Guntin & Gust, PLC; Douglas Schnabel

(57) ABSTRACT

Aspects of the subject disclosure may include, for example, receiving, from an application server and by a service capability exposure function (SCEF) including a processing device, a current location request associated with an narrow band Internet of Things (NB-IoT) device, transmitting, by the SCEF, a location estimation trigger request including a device identity to a gateway mobile location center (GMLC), receiving, from the GMLC and by the SCEF, a terminated location estimation response including a position estimate, wherein the position estimate is determined at an enhanced serving mobile location center (ESMLC) according to the location estimation trigger request, determining, by the SCEF, whether the terminated location estimation response meets a quality metric for positioning of the NB IoT device, and transmitting, by the SCEF, the position estimate for the NB-IoT device to the application server responsive to determining that the position estimate meets the quality metric, wherein transmissions between the SCEF and the GMLC are via control plane signaling. Other embodiments are disclosed.

20 Claims, 7 Drawing Sheets

(51) Int. Cl.
*H04L 29/08* (2006.01)
*H04W 8/24* (2009.01)
*H04W 4/02* (2009.01)

(58) Field of Classification Search
CPC ............ G01S 5/10; G01S 5/14; G01S 5/0081; H04M 2207/18; H04M 2242/30; H04M 3/42348
USPC ...................................................... 455/456.1
See application file for complete search history.

(56) References Cited

U.S. PATENT DOCUMENTS

| | | | |
|---|---|---|---|
| 8,787,942 | B2 | 7/2014 | Hannan et al. |
| 8,838,806 | B2 | 9/2014 | Lu et al. |
| 8,908,562 | B2 | 12/2014 | Jin et al. |
| 8,934,909 | B2 | 1/2015 | Koskela et al. |
| 9,002,393 | B2 | 4/2015 | Seed et al. |
| 9,094,816 | B2 | 7/2015 | Maier et al. |
| 9,137,647 | B2 | 9/2015 | Mahajan |
| 9,179,409 | B2 | 11/2015 | Gupta et al. |
| 9,232,498 | B2 | 1/2016 | Mohanty et al. |
| 9,232,524 | B2 | 1/2016 | Tian et al. |
| 9,247,554 | B2 | 1/2016 | Van Phan et al. |
| 9,288,114 | B2 | 3/2016 | Zhang et al. |
| 9,307,344 | B2 | 4/2016 | Rucker et al. |
| 9,326,173 | B2 | 4/2016 | Luft |
| 9,363,819 | B2 | 6/2016 | Wang et al. |
| 2010/0029211 | A1 | 2/2010 | Teague et al. |
| 2011/0200052 | A1 | 8/2011 | Mungo et al. |
| 2012/0082091 | A1* | 4/2012 | Siomina ................. H04W 4/02 370/328 |
| 2012/0088521 | A1* | 4/2012 | Nishida ................... H04W 4/20 455/456.1 |
| 2012/0203905 | A1 | 8/2012 | Lee et al. |
| 2012/0302261 | A1 | 11/2012 | Tinnakornsrisuphap et al. |
| 2013/0190006 | A1 | 7/2013 | Kazmi et al. |
| 2013/0265984 | A1 | 10/2013 | Li et al. |
| 2014/0176366 | A1* | 6/2014 | Fischer ............... H04W 64/006 342/374 |
| 2014/0244834 | A1 | 8/2014 | Guedalia et al. |
| 2015/0045057 | A1 | 2/2015 | Tee et al. |
| 2015/0134761 | A1 | 5/2015 | Sharma et al. |
| 2015/0195670 | A1 | 7/2015 | Agee |
| 2015/0199610 | A1 | 7/2015 | Hershberg |
| 2015/0264512 | A1 | 9/2015 | Jain et al. |
| 2015/0334545 | A1 | 11/2015 | Maier et al. |
| 2015/0358777 | A1 | 12/2015 | Gupta |
| 2016/0007138 | A1 | 1/2016 | Palanisamy et al. |
| 2016/0007316 | A1 | 1/2016 | Vaidya et al. |
| 2016/0044651 | A1 | 2/2016 | Lu |
| 2016/0100362 | A1 | 4/2016 | Palanisamy et al. |
| 2016/0105891 | A1 | 4/2016 | Li et al. |
| 2016/0135143 | A1 | 5/2016 | Won et al. |
| 2016/0164831 | A1 | 6/2016 | Kim |

FOREIGN PATENT DOCUMENTS

| | | |
|---|---|---|
| CN | 102170561 A | 8/2011 |
| CN | 103532798 A | 1/2014 |
| CN | 103634734 A | 3/2014 |
| CN | 103843261 A | 6/2014 |
| EP | 2869644 A1 | 5/2015 |
| EP | 3018946 | 5/2016 |
| GB | 2510141 A | 7/2014 |
| WO | 2015153589 | 10/2015 |
| WO | 2015191835 | 12/2015 |
| WO | 2015200801 | 12/2015 |
| WO | 2016036469 | 3/2016 |
| WO | 2016045602 | 3/2016 |
| WO | 2016073533 | 5/2016 |

OTHER PUBLICATIONS

Husain, Syed , "Recent Trends in IoT/M2M related Standards", https://www.researchgate.net/profile/Athul_Prasad/publication/271763342_Recent_Trends_in_Standards_Related_to_the_Internet_of_Things_and_MachinetoMachine_Communications/links/5523806d0cf2f9c1305469d4.pdf, 2014.

Kassem, Mohamed, "Future Wireless Spectrum Below 6 GHz: A UK Perspective", http://homepages.inf.ed.ac.uk/mmarina/papers/dyspan15.pdf, Discloses estimating device locations for an IoT/M2M database (Figure 4 and in Section B on the 8th thru 11th Pages)., 2015.

Kunz, Andreas, "Enhanced 3GPP system for Machine Type Communications and Internet of Things", https://www.researchgate.net/profile/Athul_Prasad/publication/281857143_Enhanced_3GPP_system_for_Machine_Type_Communications_and_Internet_of_Things/links/55fbcbed08ae07629e07c2aa.pdf, 2015.

Salman, Tara, "Networking Protocols and Standards for Internet of Things", http://www.cse.wustl.edu/~jain/cse570-15/ftp/iot_prot.pdf, Discloses recognizing the need for IoT devices to move freely and change configuration bades on location (pp. 8, 10 and 21)., 2015.

Samdanis, Konstantinos, "From Network Sharing to Multi-tenancy: The 5G Network Slice Broker", http://arxiv.org/pdf/1605.01201, Disclosing that the 3GPP Service Capability Exposure Function (SCEF)in the operator trust domain securely exposes selected service capabilities (Section 4, p. 6 and Figure 4)., 2016.

Shin, Jung Wan et al., "Control Channel Load Balancing in Narrow Band Cellular IoT Systems Supporting Coverage Class", http://uksim.info/isms2016/CD/data/0665a343.pdf, Discloses dynamically reconfiguring channels when narrow-band devices are moved into a new location (p. 346)., 2016.

Song, Jaeseung , "Connecting and Managing M2M Devices in the Future Internet", https://www.researchgate.net/profile/Mischa_Schmidt/publication/262290895_Connecting_and_Managing_M2M_Devices_in_the_Future_Internet/links/55ba132b08aed621de0a9f4c.pdf, Disclosing a server mapping machine-type communications(MTC) (p. 3; Figure 2)., 2014.

Wang, Qing et al., "Dynamic Spectrum Allocation under Cognitive Cell Network for M2M Applications", http://researcher.watson.ibm.com/files/us-the/WangEtal12Asilomar.final.pdf, Discloses obtaining locations for synchronizing cell and mitigating interference (p. 3, Section II-B)., 2012.

Xiong, Xiong, "Low Power Wide Area Machine-To-Machine.Networks: Key Techniques and Prototype", https://www.researchgate.net/profile/Periklis_Chatzimisios/publication/281896505_Low_power_wide_area_machine-to-machine_networks_key_techniques_and_prototypedinks/563a12c608aeed0531dc9e72.pdf, Discloses locating newly-placed, mobile & battery-powered equipment (pp. 68-70, ultra narrow-band on p. 64)., 2015.

Yang, Wenjie Kristo et al., "Power- and Spectrally-Efficient Network Access for Cellular Machine-Type Communications", http://arxiv.org/pdf/1512.05500, Discloses resolving ambiguities resulting from lack of device identifier in the LTE random access preamble with a special mapping signal (p. 9, Section B)., 2015.

* cited by examiner

100

200

400

METHOD AND APPARATUS FOR ASSET LOCATION TRACKING IN A COMMUNICATION NETWORK

FIELD OF THE DISCLOSURE

The subject disclosure relates to a method and apparatus for asset location in a communication network.

BACKGROUND

Modern telecommunications systems provide consumers with telephony capabilities while accessing a large variety of content. Consumers are no longer bound to specific locations when communicating with others or when enjoying multimedia content or accessing the varied resources available via the Internet. Network capabilities have expanded and have created additional interconnections and new opportunities for using mobile communication devices in a variety of situations. Intelligent devices offer new means for experiencing network interactions in ways that anticipate consumer desires and provide solutions to problems.

BRIEF DESCRIPTION OF THE DRAWINGS

Reference will now be made to the accompanying drawings, which are not necessarily drawn to scale, and wherein.

DETAILED DESCRIPTION

Figure 1:
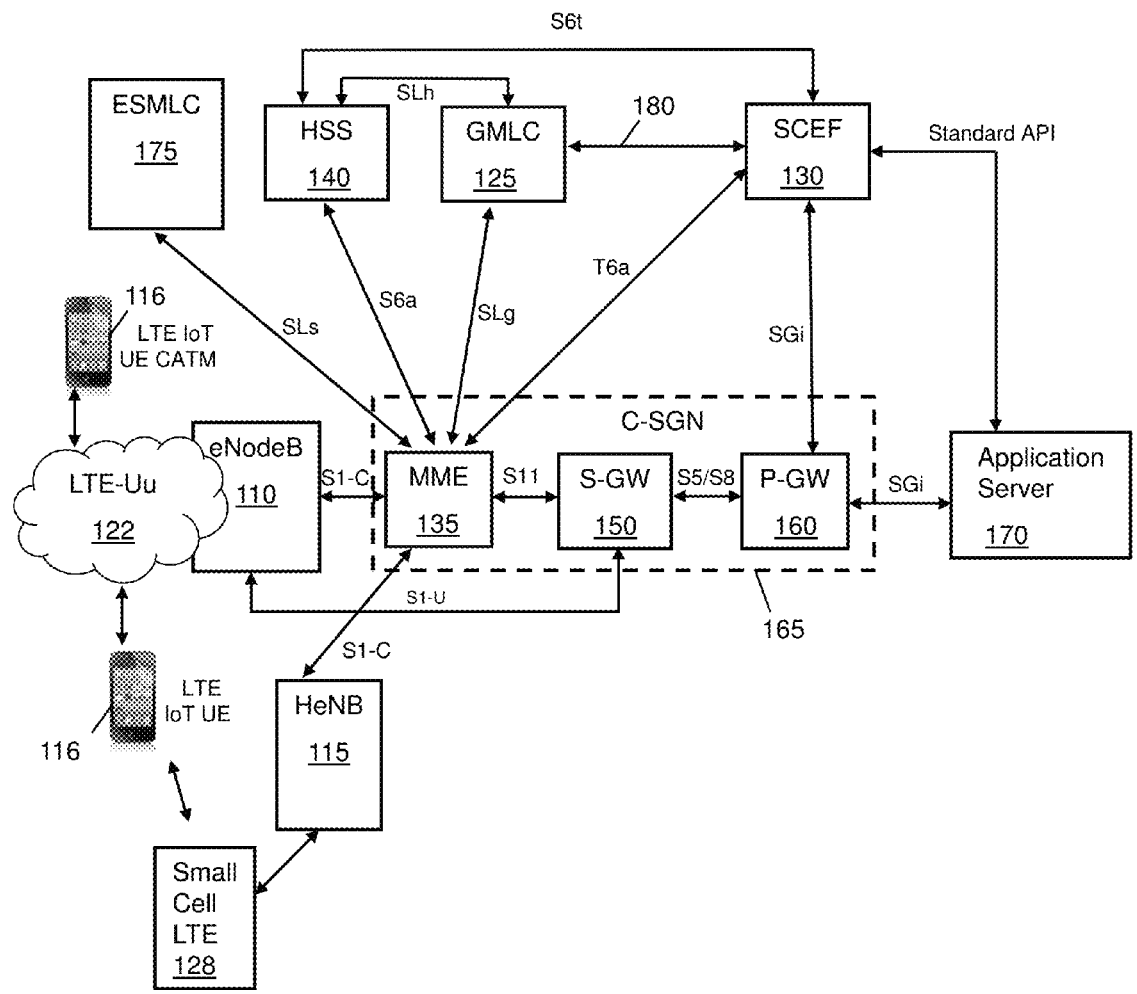
FIG. 1 depicts illustrative embodiments of a system for providing services for locating narrow band wireless devices in a mobile communication network

The subject disclosure describes, among other things, illustrative embodiments for a method and an apparatus for providing location information for narrow band Internet of Things (NB-IoT) devices in a mobile communication system. An external Application Server can request a current location of a NB-IoT device from a service capability exposure function (SCEF) server. The SCEF server can determine an identity of the NB-IoT device from the request. The SCEF server can also determine client type from the request. The SCEF server can use the identity and client type information to determine a priority of the request and, in turn, to determine whether to further process the request based on the priority. If the SCEF server decides to process the request, the SCEF server can select a position determination method. The SCEF can send a location estimation request to a gateway mobile location center (GMLC) of the communication network The GMLC can determine which mobile management entity (MME) is servicing the NB-IoT device by contacting a home subscriber server (HSS). The GMLC can then route the location estimate request to an enhanced serving mobile location center (ESMLC), via the MME. The ESMLC can determine a position estimate for the NB-IoT device, based on the position determination method, and return the position estimate to the GMLC in a response message. The GMLC can forward the position estimate to the SCEF server, which can reply to the Application Server using an API message including the position estimate for the NB-IoT device. Other embodiments are described in the subject disclosure.

One or more aspects of the subject disclosure include a service capability exposure function (SCEF) server, including a processing system including a processor and a memory that stores executable instructions that, when executed by the processing system, facilitate performance of operations, including receiving, from an application server, a current location request associated with a narrow band Internet of Things (NB-IoT) device. The operations can include determining a device identity of the NB-IoT device and a client type of the application according to the current location request and determining a location request priority of the current location request according to the device identity, the client type, or any combination thereof. The operations can also include determining whether to send a location estimation trigger according to the location request priority of the current location request. Responsive to determining to send the location estimation trigger, the operations can further include determining a position determination method according to the device identity, the client type, or any combination thereof. The operations can include transmitting a location estimation trigger request, including the device identity and the position determination method, to a gateway mobile location center (GMLC). The operations can also include receiving, from the GMLC, a terminated location estimation response including a position estimate, wherein the position estimate is determined at an enhanced serving mobile location center (ESMLC) according to the location estimation trigger request. The operations can also include transmitting the position estimate for the NB-IoT device to the application server, wherein transmissions between the SCEF and the GMLC are via control plane signaling.

One or more aspects of the subject disclosure include a machine-readable storage medium, comprising executable instructions that, when executed by a processing system including a processor, facilitate performance of operations at service capability exposure function (SCEF) server, including receiving, from an application server, a current location request associated with a narrow band Internet of Things (NB-IoT) device and, in turn, determining a location request priority of the current location request according to a device identity of the NB-IoT device, a client type of the application server, or any combination thereof. The operations can include determining whether to send a location estimation trigger according to the location request priority of the current location request. Responsive to determining to send the location estimation trigger, the operations can further include transmitting a location estimation trigger request, including the device identity and a position determination method to a gateway mobile location center (GMLC). The operations can also include receiving, from the GMLC, a terminated location estimation response including a position estimate, wherein the position estimate is determined at an enhanced serving mobile location center (ESMLC) according to the location estimation trigger request. The operations can further include transmitting the position estimate for the NB-IoT device to the application server, wherein transmissions between the SCEF and the GMLC are via control plane signaling.

One or more aspects of the subject disclosure include a method, including receiving, from an application server and by a service capability exposure function (SCEF) including a processing device, a current location request associated with a narrow band Internet of Things (NB-IoT) device. The method can also include transmitting, by the SCEF, a location estimation trigger request including a device identity to a gateway mobile location center (GMLC). The method can further include receiving, from the GMLC and by the SCEF, a terminated location estimation response including a position estimate, wherein the position estimate is determined at an enhanced serving mobile location center (ESMLC) according to the location estimation trigger request. The method can include determining, by the SCEF, whether the terminated location estimation response meets a quality metric for positioning of the NB IoT device. The method can also include transmitting, by the SCEF, the position estimate for the NB-IoT device to the application server responsive to determining that the position estimate meets the quality metric, wherein transmissions between the SCEF and the GMLC are via control plane signaling.

Figure 2:
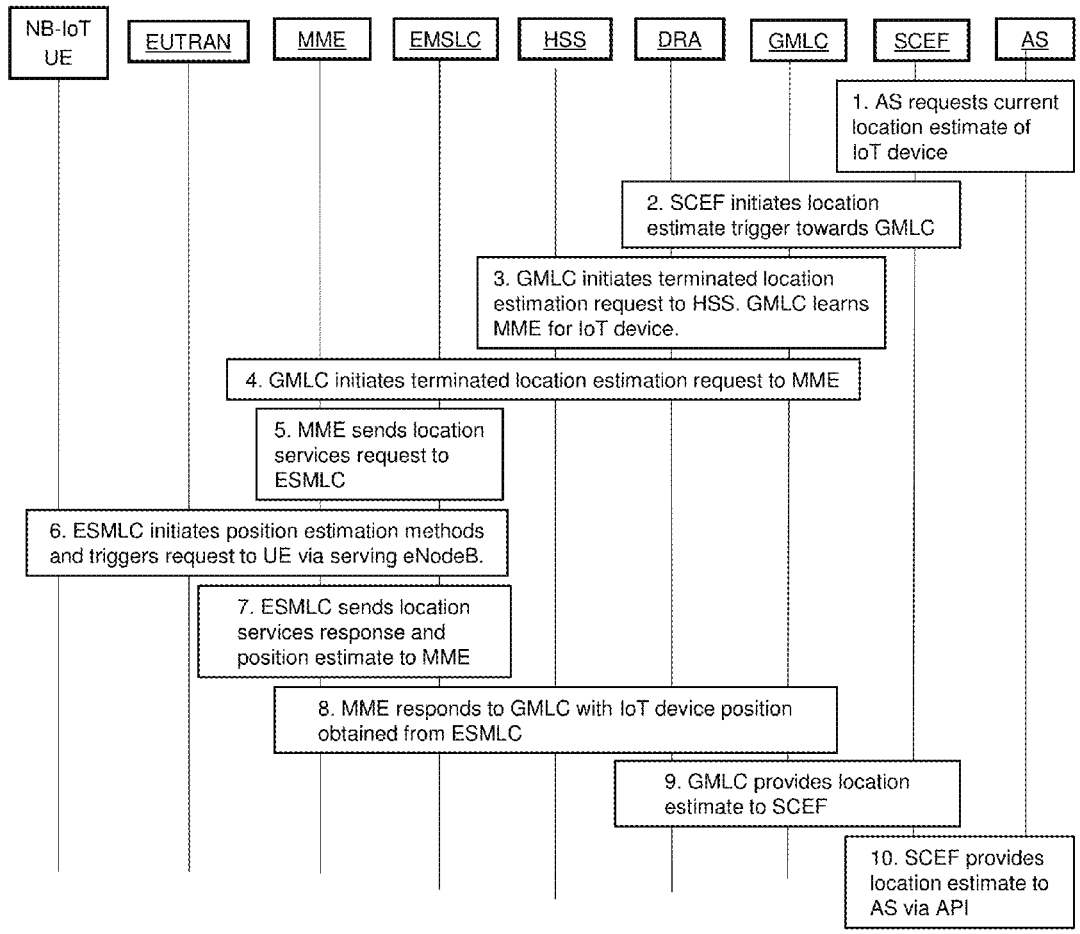
FIG. 2 depicts illustrative embodiments of a data flow diagram for providing locations of narrow band wireless devices in a mobile communication network

In FIG. 1, a mobile communication system 100 is illustrated that can provide services for locating narrow band wireless devices in a mobile communication network. The system 100 can provide wireless communication services, including voice, video and/or data services to wireless communication devices 116. In addition, FIG. 2 depicts illustrative embodiments of a data flow diagram for providing location information for narrow band wireless devices in a mobile communication network.

System 100 of FIG. 1 is a simplified version of a network capable of providing wireless communication services for wireless devices 116. System 100 can enable wireless communication services over a number of different networks, such as between wireless communication devices 116 and/or other communication devices and/or one or more application servers 170. The wireless communication devices 116 can be capable of voice, video and/or data communications, including cellular phones, smartphones, personal computers, media processing devices, and so forth. The wireless communication devices 116 can be fixed location machines, including Category M (CATM) devices, with wireless communication capabilities, such as vending machines, utility meters, and monitoring devices that can advantageously communicate through the wireless capabilities of the system 100. The wireless communication devices 116 can be Narrow Band Internet of Things (NB-IoT) devices, which can exhibit characteristics of intermittent data transfer activity and the use of a narrow bandwidth of the available wireless data channel. The wireless communication devices 116 can be movable from location to location, while remaining wirelessly connected to the system 100 via various wireless communication assets of the system 100. The wireless communication devices 116 can, alternatively, remain in fixed locations with respect to the wireless communication assets of the system 100 so that, effectively, the wireless communication devices 116 can rely on specific wireless communication assets of the system 100.

In one or more embodiments, in addition to the wireless communication devices 116, the system 100 can include one or more Radio Access Networks (RAN) or Radio Access Technologies (RAT). In one embodiment, the system 100 can include a Universal Terrestrial Radio Access Network (UTRAN) capable of supporting a wireless interface to a wireless communication devices 116 in a Third Generation Wireless Mobile Communication Technology (3G) system. In this example, the system 100 can support 3G IoT user equipment (3G IoT UE). In one embodiment, the system 100 can include a Long-Term Evolution (LTE) Radio Access Technology (RAT) network, or an LTE-Uu network 122, such as an Evolved UMTS Terrestrial Radio Access Network (E-UTRAN), a Universal Mobile Telecommunications System (UMTS), a Global System for Communications (GSM) network, an Evolution Data Only (EVDO) network, or a Code Division Multiple Access (CDMA) network. A LTE-Uu network can provide radio communication assets for wireless connectivity between a wireless communication device 116 and a Mobile Packet Core (MPC) of the system 100. An LTE-Uu network 122 can utilize a number of interfaces, including Iu, Uu, Iub and/or Iur.

In one or more embodiments, the system 100 can also include various functions and services. A Service Capability Exposure Function (SCEF) 130 can provide a non-IP packet data network (PDN) data path for the wireless communication device 116 to an Application Server (AS) 170. A Cellular IoT Serving Gateway Node (C-SGN) 165 can include a mobile management entity MME 135, a serving gateway S-GW 150, and a PDN gateway P-GW 160. The can C-SGN 165 can provide a user plane, PDN path to the AS 170. In one or more embodiments, the system 100 can include a Home eNodeB node (HeNB) 115, which can perform a similar function to the eNodeB node 110, but can be optimized for a Small Cell LTE 128, such as relatively low-powered RAN that can operate in a building.

In one or more embodiments, an NB-IoT device 116 can be coupled to an eNodeB 110, via an LTE-Uu network 122. The NB-IoT device 116 can carry many traffic types, including IP-based packet data network (PDN) traffic and non-IP PDN traffic. In one or more embodiments, an E-UTRAN-based, LTE-Uu network 122 can include one or more eNodeB nodes 110 on the network that can be connected to each other via X2 interfaces and that can be further connectable to the network 100 via an S1-C interface. For example, an E-UTRAN-based LTE-Uu 122 can use various communication techniques, including orthogonal frequency-division multiplexing (OFDM), multiple-input multiple-output (MIMO) antenna technology, depending on the capabilities of the terminal, and can use beam forming for downlink to support more users, higher data rates and lower processing power required on each handset.

In one or more embodiments, an eNodeB 110 can include an air interface to an LTE-Uu network 122 and can include network interfaces S1-C to the Mobility Management Entity (MME) 130. The air interface can support an E-UTRAN-based LTE-Uu network 122, which can further support downlink and uplink protocols, including Orthogonal Frequency-Division Multiple Access (OFDMA) protocol and/or Single-Carrier Frequency-Division Multiple Access (SC-FDMA) protocol. The LTE-Uu interface 122 can enable the eNodeB 110 to receive requests for connection to the system 100 from various types of wireless communication devices 116, including smart phone devices and NB IoT devices.

In one or more embodiments, the eNodeB 110 can perform operations consistent with the 3GPP standard. In one or more embodiments, the eNodeB 110 can request attachment of the NB-IoT device 116 to the network 100. In one embodiment, the eNodeB 110 can forward a connection request from the wireless communication device 116 to the MME 135. An authentication request for the NB-IoT device 116 can be forwarded to the MME 135, for example, via a Non-Access Stratum (NAS) protocol message. The NAS protocol authentication request can information flow directly from the wireless communication device 116 to the MME 135, via a tunneling protocol (GTP) link between eNodeB 110 and MME 135. At the MME 135, the authentication request can be converted to an Internet Engineering Task Force (IETF) standard authentication message protocol, such as the Diamond protocol. The converted, authentication message in the Diamond protocol can be forwarded to a Home Subscription Service (HSS) server 140 for verification of the authentication request for the NB-IoT device 116. In one embodiment, when the NB-IoT device 116 is booted up, it can send an attach request or an authentication request to the MME 135 via eNodeB 110.

In one or more embodiments, the Home Subscriber Server (HSS) 140 can provide a central database that contains user-related and subscription-related information. The functions of the HSS 140 can include mobility management, call and session establishment support, user authentication and access authorization. In one embodiment, the HSS 140 can manage subscription-related information in real time, for multi-access and multi-domain offerings in an all-IP environment. The HSS 140 can be based on Home Location Register (HLR) and Authentication Center (AuC).

Upon powering up, the NB-IoT device 116 can attach to a RAN, which can include the LTE-Uu 122 and the eNodeB node 110. Further, the NB-IoT device 116 can seek to attach to the system 100 via a serving MME 135 that is within a given geographic coverage area, typically of a local RAN 122 and 110. In one or more embodiments, if a NB-IoT device 116 does not have any type of activity over a certain time period, then the device 116 can enter into an IDLE mode in order to preserve its battery life. In one embodiment, the NB-IoT device 116, the network RAN 122 and 110, and the MME 135 can support an extended IDLE mode DRX capability that can save radio transmission power, as well as further extend the battery life of the device 116. An internal or external trigger can cause the NB-IoT device 116 to transmit data. In this case, the NB-IoT device 116 may need to establish a data connection to be able to engage in data transfer with the network 100 and/or a target application service (AS) 170 and/or a target application provider.

In one or more embodiments, during an attach attempt and/or during a PDN connectivity procedure for an NB-IoT device 116, the serving MME 135 can request an authentication of the NB-IoT device 116. The MME 135 can initiate the authentication with the assistance of the HSS 140 of the system 100. Upon successfully authenticating of the NB-IoT device 116, the MME server 135 can select a service capability exposure function (SCEF) 135 that can act as a gateway towards the external application server (AS) provider 170 for non-IP PDN communications with the AS 170.

In one or more embodiments, where the HSS 115 returns a successful authentication of the NB-IoT device 116, the MME 135 can also perform control plane functions for enabling IP PDN communications with the AS 170. In one embodiment, the MME 135 can assign one or more bearer gateways 150 and 160 for use in transporting user data to and from the wireless communication device 116. For example, the MME 135 can assign one or more default bearer gateways 150 and 160 and/or one or more dedicated bearer gateways 150 and 160.

In one or more embodiments consistent with the 3GPP standard, after the MME 135 has performed assignment of bearer gateways 150 and 160 for the wireless communication device 116, the MME 135 can further perform updates and handovers on behalf of the wireless communication device 116 as the wireless communication device 116 moves between various LTE-Uu wireless network 122 locations. The MME 135 can assign initial bearer gateways 150 and 160 for the wireless communication device 116 based on location information associated with the NB-IoT device 116. However, if the NB-IoT device 116 moves to a different location, then the MME 135 can be required to update the assignment of the bearer gateways 150 and 160 to fulfill performance requirements. Hence, the MME 135 can assign and maintain bearer pathways for user data for the NB-IoT device 116. In one or more embodiments, the eNodeB 110 supports a tunneling protocol pathway for authentication, control plane, and user plane for the wireless communication device 116.

In one or more embodiments, the MME 135 can also perform functions such as idle mode tracking and paging procedure including retransmissions. The MME 135 can choose S-GW 150 for the NB-IoT device 116. The S-GW 150 can route and forward user data packets, while also acting as the mobility anchor for the user plane during inter-eNodeB handovers and as the anchor for mobility between LTE and other 3GPP technologies. For a NB-IoT device 116 in idle state, the S-GW 150 can terminate a downlink data path and can trigger paging when downlink data arrives for the NB-IoT device 116. The S-GW 150 can manage and can store contexts, such as parameters of an IP bearer service and/or network internal routing information.

In one or more embodiments, the PDN Gateway (P-GW) 160 can provide connectivity from the NB-IoT device 116 to external packet data networks, including the AS 170, by being the point of exit and entry of traffic for the NB-IoT device 116. The NB-IoT device 116 can have simultaneous connectivity with more than one P-GW 160 for accessing multiple PDNs. The P-GW 160 can perform policy enforcement, packet filtering for each user, charging support, lawful interception and/or packet screening. The P-GW 160 can also act as the anchor for mobility between 3GPP and non-3GPP technologies such as WiMAX and 3GPP2 (CDMA 1× and EvDO).

In a conventional and simplistic NB-IoT LTE core network 100, the MME 135 can be connected to the SCEF 135 in a 1:1 peered mode. The SCEF 135 could also be connected to the external IoT application server (AS) 170 in a 1:1 peered mode. These connections can enable data transfers associated with a given AS 170. In this simplified arrangement, the NB-IoT device 116 can be attached to the LTE high-speed mobility network to gain services from their target AS 170 in a Home PLMN (HPLMN) network 100. The NB-IoT device 116 and eNodeB 110 can initiate an attach request procedure and/or PDN connectivity request procedures with the MME server 135 for that geographical RAN region. The attach procedure can then authenticate the NB-IoT device 116 prior to establishment of its non-IP PDN data connection towards the SCEF.

Figure 3:
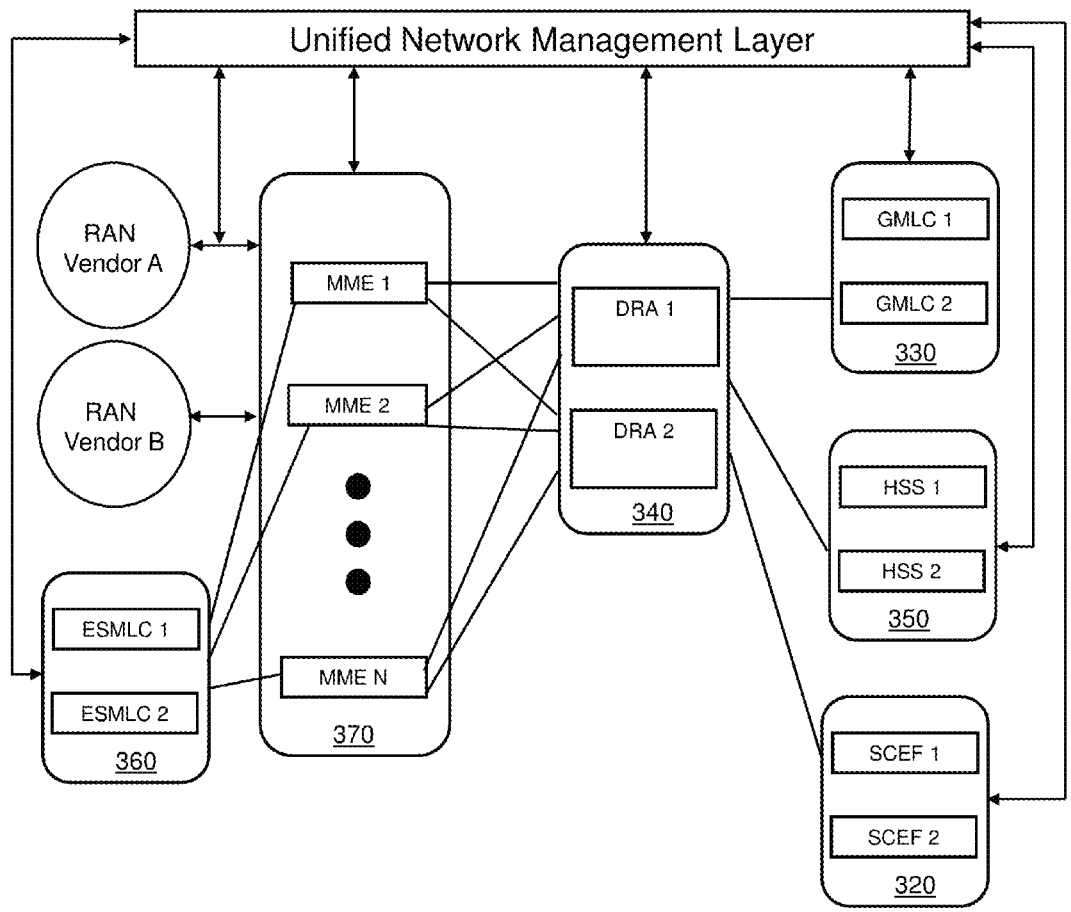
FIG. 3 depicts illustrative embodiments of a system for providing locations for narrow band wireless devices in a mobile communication network using geo-redundant data centers with dynamically paired modes

In one or more embodiments, prior to the PDN connection establishment for the NB-IoT device 116, the MME server 135 can have connectivity with the SCEF 135 using the T6a signaling interface as defined in the 3GPP standards. The T6a interface can be Diameter based and can use SCTP as the transport layer protocol with a defined application identifier. The direct connectivity between MME and SCEF simplifies the overall LTE core network architecture design for NB-IoT device 116 services delivery. In such a paired mode design, the MME and SCEF networking entities can have proper nodal identification, addressing and configuration to be able to exchange bidirectional control plane message exchanges that can enable user payload data transfers. However, a multi-homed network, such as illustrated in FIG. 3, can result in a much simpler T6a interface SCTP profile, Diameter protocol and application layer definitions, and IP addressing. The simple IoT core network 100 of FIG. 1, can require direct MME-SCEF interconnections and the availability of active T6a links for establishing the PDN connection setup with the SCEF 135. The resulting PDN connection can also trigger the creation of an EPS bearer context in the MME server 135 and the SCEF 135. The bearer context information that is created in the MME server 135 and the SCEF 135 can be critical for facilitating ingress/egress data transfer between the SCEF 135 and related upstream/downstream peer networking entities to create a successful end-to-end data service flow for the NB IoT devices 116.

Narrow band Internet of Things (NB-IoT) is a new category within the IoT domain that is gaining significant momentum in next generation of standards based cellular IoT. Given the industry competition from various low power wide area networking (LPWAN) technologies, some of which are proprietary and/or closed solutions, the 3GPP LTE standards address this industry segment and provide an alternate network delivery strategy that carriers and IoT service providers could adopt to meet the massive IoT explosion that is anticipated for NB-IoT devices. A variety of IoT chipsets/devices/modules have proliferated in development from established and emerging silicon vendors in hopes of delivering the promise of enhanced capabilities. These devices are anticipated to be embedded into a multitude of industry verticals including sensors, fleet transportation, automotive, e-health, and so forth to implement "networks of networks" initiatives that can be used to realize a smarter global connectivity infrastructure.

Billions of devices may already be equipped with tracking capabilities. With the proliferation of LTE-based cellular IoT technologies, the industrial IoT market is likely to grow significantly as consumers and enterprises seek to track the location and health of these devices. IoT service providers can coordinate with carriers interfacing with the services capability exposure function (SCEF) as the mobility edge entity to be able to develop eco-system with services platforms that connect to any type of NB-IoT devices to extract location information using any positioning method supported by the underlying network on demand. To build such applications, IoT platforms can support location-based services for visually displaying assets and geo-fencing to receive alerts if the targeted equipment and/or shipment travel outside of a given region. Software-enabled systems can us intelligence provided by the underlying LTE network-SCEF function to provide a foundation for remote asset management, tracking, mapping and reporting.

In one or more embodiments, a new signaling interface 180 can be implemented to provide two-way communication between the SCEF server 130 and a Gateway Mobile Location Center (GMLC) 125. This communication interface 180 can use standard Diameter application protocol. In one or more embodiment, the SCEF server 130 can acts as a Location Services Client that can initiate a trigger for IoT device asset tracking with the GMLC 125. In one or more embodiments, signaling procedures can used by the interface 180 for accessing location services that can compute the position of an NB-IoT device 116 and that can report this location information to the SCEF server 130. The SCEF server 130 in turn can package this into a Location Reporting API to be shared with Application Server 170 and/or other service providers.

In one or more embodiments, in the NB-IoT cellular network architecture proposed by the 3GPP standards, the NB-IoT devices 116 attach to the cellular IoT serving gateway node (C-SGN) 165. The C-SGN 165 can include the traditional MME 135, S-GW 150, P-GW 160 EPC core network functions. C-SGN 165 can also interfaces with the HSS 140 on an S6a Diameter interface and/or a SCEF server 130 on a T6a Diameter interface. The SCEF server 130 can also connect to the HSS 140 via an S6t Diameter interface. When an NB-IoT device 116 attaches to the C-SGN 165, the MME 135 component of C-SGN can authenticate the device 116 with the HSS 140 in cases where the HSS 140 has been pre-configured with a subscription profile for the NB-IoT device 116. Upon successfully authenticating the NB-IoT device 116, the MME 135 and the SCEF server 130 can establish a non-IP PDN data connection for the NB-IoT device 116. The NB-IoT device 116 can also be connected with an EPS bearer context that is created via the MME 135 and the SCEF server 130. In one or more embodiments, after the NB-IoT device 116 is connected, the NB-IoT device 116 can be ready for a non-IP data transfer over the control plane. The control plane, which uses the SCEF server 130 as the data path between the NB-IoT device 116 and the Application Server 170, can provide very efficient data delivery for low bandwidth transmissions that may occur infrequently.

In one or more embodiments, an IoT service provider may need to track an NB-IoT device 116 that is based within a geographic region on demand. In this situation, the IoT service provider can use an external Application Service 170 to initiate a requests for the location of the NB-IoT device 116. The Application Sever 170 can make this request to the SCEF server 130. The SCEF server 130 may lack a means for extracting accurate location estimates of the NB-IoT device 116 that it serves. However, as part of the non-IP PDN connection establishment process, the SCEF server 130 could obtain a cell ID location of a serving device, such as a specific eNodeB 110, from the MME 135. The SCEF server 130 could use a known location of the eNodeB 110 as an estimated location for the NB-IoT device 116. Alternately, the SCEF server 130 could perform location event monitoring towards the MME 135 to extract a device location at the cell level via an EUTRAN Cell Global Identifier (ECGI). However, the cell level information that is reported by the MME 135 may not be adequate for accuracy requirements of certain IoT service providers.

In one or more embodiments, in order to ensure more accurate positioning estimates are provided by the mobility network to the service providers, a dedicated signaling interface 180 can be implemented between the SCEF server 130 and the GMLC 125 in the LTE network. The dedicated signaling interface 180 can provide a communications link between the SCEF server 130, operating at the mobile edge, and the GMLC 125, operating in the location services infrastructure. A Diameter-based interface 180 could leverage various attributes defined by the IETF standards and could enable initiation of the location triggers towards the MME 135. The SCEF server 130 can then receive more accurate positioning estimates of the targeted NB-IoT device 116 from the MME 135 based on location services protocol exchanges between MME 135 and an Enhanced Serving Mobile Location Center (ESMLC) 175. The ESMLC 175 can use intelligent positioning methods to extract more an accurate position estimate for the NB-IoT device 116 and to report this estimate to the GMLC 125, which can, in turn, relay the position estimate to the SCEF server 130. The SCEF server 130 can then map the data based on the device context and report this mapping to the Application Server 170 via a standardized and structured Location Reporting API to the service provider.

In one or more embodiments, the SCEF server 130 can select between multiple methods for determining the position of the NB-IoT device 116. A single method may not work well in all environments when trying to estimate/track the location of a wide variety of IoT devices being served by multiple radio access technologies. New positioning solutions may be added to a list of possible selections to provide a wide range of complementary positioning methods and techniques, which adapt to the dynamics of the radio environment.

In one or more embodiments, the system 100 supports both control plane (CP) as well as user plane (UP) based location services for determining locations of NB-IoT device 116 that are associated with emergency 911 calls. In CP-based positioning, a location services request is always sent by the MME 135 to the ESMLC 175, and a response is collected and controlled by the GMLC 125. In UP-based positioning, information is exchanged via the data bearer path of the C-SGN 165 using secure user plane location (SUPL) protocol in the application layer. The CP-based positioning strategy can provide more efficient performance for Narrow Band IoT (NB-IoT) type devices, because these devices are not typically involved in extensive IP user data transfers. NB-IoT devices 116 are typically of much simpler design relative to their smart phones/tablets counterparts, as well as being less complex, more cost-effective for massive adoption, and exchange low in frequency and small is size Non-IP data over the LTE network. Where the system 100 is supporting NB-IoT devices 116, there may not be a need for a standard IP based PDN connection using a traditional LTE data path model.

Adoption of a CP-based model for exchange of Non-IP Data between NB-IoT devices 116 and Application Servers 170, may eliminate the need for the bearer setup process for triggering UP-based data transfer. Proposed 3GPP standards for machine type communications (MTC) may not provide a means to leverage the services capability exposure function (SCEF) for enhancing positioning performance and tracking of such NB-IoT devices 116. In one or more embodiments, a signaling interface between the SCEF server 130 and the GMLC 125 can provide that provides CP-based location triggering, which can support operator-assisted triggering of IoT positioning/tracking services, on demand, and then securely expose such estimated location results to the external IoT providers.

In one or more embodiments, as illustrate in FIG. 1, a simple IoT core network design allows LTE capable, NB-IoT devices 116 to attach to the network 100 to gain online connectivity. As part of an Attach Procedures in the EUTRAN, the NB-IoT device 116 can be authenticated by the serving MME 135 and the HSS 140. Upon completion of authentication and location update procedures with the HSS 140, the MME 135 can setup a Non-IP PDN connection with the SCEF server 130 to support data transfers between the NB-IoT device 116 and one or more Application Servers 170. The MME 135 can direct the connection to the SCEF server 130 based on analysis of the subscription data associated with the NB-IoT device 116 that the MME 135 receives from the HSS 140, as well as device capabilities. Prior to this juncture a direct connectivity path can be established between the MME 145 and the SCEF server 130 via a T6a Diameter interface and an active T6a signaling link. A process a the MME 135 and the SCEF 130 can initiate a Non-IP PDN connection, which can trigger the creation of an EPS bearer context, an allocated EPS bearer ID, along with the IMSI and Non-IP PDN connection type. In one or more embodiments, once the context information has been created in the MME 135 and the SCEF server 130, user data transfer can take place via the T6a CP-based signaling interface. As part of the Non-IP PDN connection setup, the MME 135 can provide the device's Cell ID information to the SCEF server 130, to enable the SCEF server 130 to be aware of the device's location as reported by the MME 135. However, this location may not necessarily be the most updated location if the device has moved into a different cell within the same tracking area.

In one or more embodiments, in order for an externally triggered location reporting request (from, for example, an Application Server 170) to be received by the NB-IoT device 116, the SCEF server 130 that hosts the context of the NB-IoT device 116 can be provided with have a means to trigger a peer node that is capable of initiating such a request towards the NB-IoT device 116. However, in spite of a network 100 providing a direct connectivity between the SCEF server 130 and the MME 135, this direct connection may not be useful for this type of location procedures, because the T6a interface is not designed to support location services and positioning. In one or more embodiments, therefore, the existing location services infrastructure of the network 100 can be leveraged to provide additional commercial IoT network based positioning services. The SCEF server 130 can include direct connectivity with a GMLC 125 that serves an MME 135 for a region. A signaling interface 180 of these features extant between the SCEF server 130 and the GMLC 125 is not defined by 3GPP standards today. A direct interface 180 between the SCEF server 130 and the GMLC 125 can serve to leverage existing location services infrastructure that handles location requests associated with emergency 911 calls. This direct connectivity can utilize Diameter-based signaling.

In one or more embodiments, the SCEF server 130 can ensure that the existing location services infrastructure is not overwhelmed by the number of requests coming in from external IoT providers. In one embodiment, the SCEF server 130 can adopt a rate limiting function on the new interface towards the GMLC 125 to limit the requests. For example, rate limiting could be triggered internally based on operator defined thresholds. The SCEF server 130 can monitor location requests and compare the number of requests to a threshold. The SCEF server 130 can then limit requests that are forwards to the GMLC based on traffic exceeding the threshold. In another example, a closed-loop feedback exchange between the SCEF server 130 and the GMLC 125 using specific load-type indicators supported/exchanged on the interface.

In one or more embodiments, the GMLC 125 can trigger, or request, positioning of an NB-IoT device 116 associated with a 911 emergency call by including LCS Client Type=Emergency. In one embodiment, the SCEF server 130 can, via the interface 180 between the SCEF server 130 and the GMLC 125, cause the GMLC 125 to trigger the location reporting while using a different client type, such as an "operator services." The GMLC 125 can use the client type information to differentiation between requests that are generated by clients of differing client types. In one embodiment, the SCEF server 130 and/or the GMLC 125 can use the client type information to prioritize between requests. By identifying and prioritizing between requests, the SCEF server 130 can ensure that regulatory services, such as 911 emergency locations, are not impacted by the use of the existing location services infrastructure in this way.

In one or more embodiments, the SCEF server 130 can host the LCS client, such as the Application Server 170, in this scenario and can trigger the request using "operator services" as the client type. Upon receiving this location trigger from the SCEF server 130, the GMLC 125 can interact with the HSS 140 via a Diameter Routing Agent (DRA), using an SLh interface to extract an identity of the serving MME-node 135 that services the NB-IoT device 116. Once the GMLC 125 triggers an IoT device location reporting request to the identified MME 135 via the SLg diameter interface, the MME 135 can initiate one or more Location Service Application Protocol (LCSAP) procedures towards the ESMLC 175 via the SLs interface. Upon receiving the LCSAP request, the ESMLC 175 can initiate positioning requests towards the RAN, such as towards the eNodeB 110. Based on a response from the NB-IoT device 116 including the requested metrics, the ESMLC 175 can provide positioning estimates to the MME 135. The MME 135, in turn, can provide these estimates back to the GMLC 125.

In one or more embodiments, once the GMLC 125 receives the positioning data from the MME 135, the GMLC can send the positioning data to the SCEF server 130 over the interface 180. In one or more embodiments, all of the positioning related to specific NB-IoT device 116 can be communicated between the NB-IoT device 116 and the SCEF server 130 happens via control plane signaling. As a result, the process for providing positioning information is more effective than a user plane SUPL-based solution. The SCEF server 130 can then analyze the location reporting data it receives from the GMLC 125. The SCEF server 130 can packages the position information into a location reporting API so that it can provide the data to the requesting IoT service provider for further analysis/processing/usage. In one or more embodiments, a geographic region may have a mix of IoT devices with different categories and priorities. By determining accurate positioning and asset tracking via a network-initiated control plane, the system 100 can provide targeted response based on their priority.

In one or more embodiments, the architecture of the mapping between the GMLC 125 and the SCEF server 130 can be one-to-one, one-to-many and/or many-to-one depending on the design considerations and desired deployment configurations. The mapping between the MME 135 and the ESMLC 175 can, likewise, be defined as one-to-one or many-to-many. In one or more embodiments, the MME 135 can be the client originating the request towards the ESMLC 175. Therefore, the MME 135 should be provisioned with correct and supported configurations of the ESMLC 175. The MME 135 should also be provisioned with correct and supported algorithmic selection processes in those architectures in which multiple ESMLCs 175 are supported for handling dedicated LCS client types.

Referring to FIG. 3, a system for providing locations for narrow band wireless devices in a mobile communication network using geo-redundant data centers with dynamically paired modes is illustrated. In one or more embodiments, the system 300 shows a high-level sample view of the distributed core network elements in a topology that can be used to address two RAN vendor types-A and B. All positioning related communications between diameter peer nodes in the core network can be controlled via a DRA data center 340 as the centralized routing agent. The eNBs from both RAN vendors connected to a center of MME 370, to enable UE measurement reports and to provide network-based positioning measurements upon request from ESMLC data center 360. Network elements for control plane based positioning in this architecture can include one or more commercial services LCS clients within the SCEF server in the SCEF data center 320 that interact via centers for HSS 350, GMLC 330, and MME 370 with the LCS server, which is the ESMLC 360. An LCS server can estimate a location of an LCS target, (i.e. an NB-IoT device 116) and can report the results back to the LCS client. A closed-loop control plane can include a routing and message exchange mechanism between the NB-IoT device 116 and the SCEF server 130 that ensures that integrity is maintained within the 3GPP network domain. The SCEF server 130 can report data towards external IoT service providers, such as Application Server 170, that are outside of the 3GPP domain using, for example, standardized RESTful APIs.

In one or more embodiments, a Unified Network Management Layer can ensure that IoT network topology, inter-connectivity, and configuration management is maintained to ensure proper functionality exists between the network elements 320-370 and that accurate location reporting requirements towards the external service providers are met with agreed upon quality.

Figure 4:
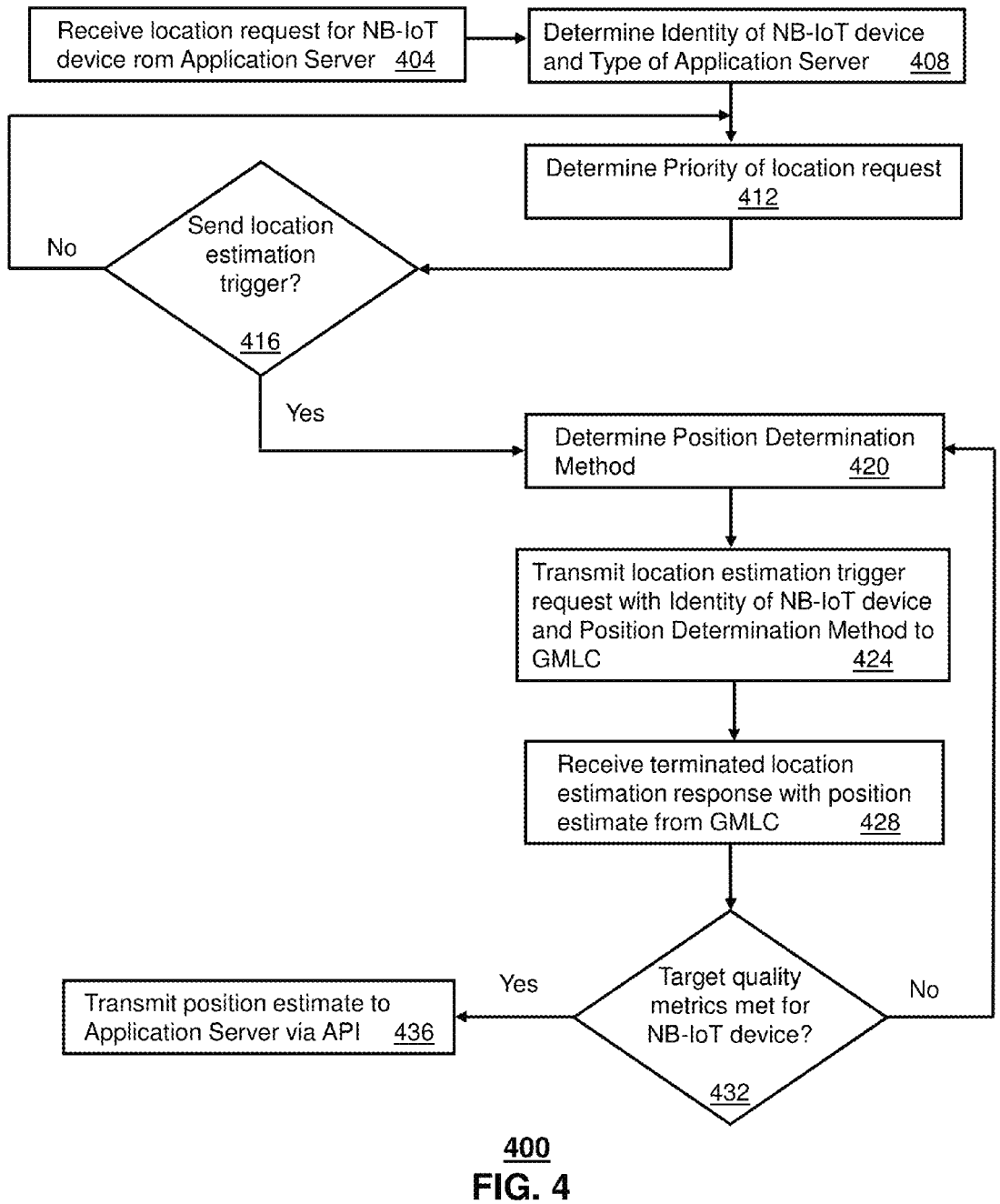
FIG. 4 depicts illustrative embodiments of a method used in portions of the systems described in FIGS. 1 and 3

FIG. 4 depicts an illustrative embodiment of a method 400 used in portions of the described in FIGS. 1 and 3-5 for providing positioning of IoT device in a mobile communication network. In one or more embodiments, a high-level algorithmic implementation for IoT device positioning estimation is shown. By leveraging the control plane LCS services, the SCEF server can use a signaling interface towards the GMLC for trigger location extraction of IoT devices on demand. The SCEF server can include additional intelligent to trigger location requests with a desired client type dedicated for IoT devices and to select one or more position determination methods. The SCEF server can trigger targeted and prioritized positioning methods at the direct the ESMLC from a list of supported methods to ensure devices are tracked as accurately as possible based on the service level agreements in place between mobile carrier and IoT service provider.

In step 404, a SCEF server can receive a request for location position of an NB-IoT device of a mobile communication network. In one embodiment, the request can be sent by an external service, such as an Application Server. The request can be generated by the Application Server based on a request by a user of the NB-IoT device. The request can come from a third party. The request can include an identification of the NB-IoT device and/or of the Client. The request can include a Client Type. In step 408, the SCEF server can identify the NB-IoT device and the Client Type. The SCEF server can parse the position request. In step 412, the SCEF server can determine a priority of the position request. The SCEF server can base the priority on the identity of the device. For example, the SCEF server can maintain a list of device identities for which relative priorities of position requests are defined. In another example, the SCEF server can determine priority based on Client Type. The SCEF server can maintain a list of Client Types that are mapped to priorities for position requests. The highest priority can be assigned to Emergency requests, such as for requests associated with 911 calls.

The SCEF server can determine, in step 416, if the server can determine if it should send a location estimation trigger to the GMLC. If the SCEF server determines that it should send the location estimation trigger, then, in step 420, the SCEF server can determine a position determination method. The SCEF server can select the position determination method from a set of available methods. The SCEF server can select the method based on the Client Type and/or the Identity of the NB-IoT device. In step 424, the SCEF server 130 can transmit the location estimation trigger to the GMLC. The location estimation trigger can include the identity of the NB-IoT device and the position determination method that was selected.

In step 428, the SLEC server can receive the location estimation response from the GMLC. The GMLC can obtain the position using the LCS resources in the system. The interface between the SLEC server and the GMLC can access the LCS resources via the control plane. In step 432, the SLEC server can determine whether the position information for the NB-IoT device meet target quality metrics. If the position is not of sufficient quality—for example, not determined to sufficient precision—then the SLEC server can determine a different position determination method in step 420. If the position estimate is of sufficient quality, then the SLEC server 130 can transmit the position estimate to the Application Server, in step 436.

Figure 5:
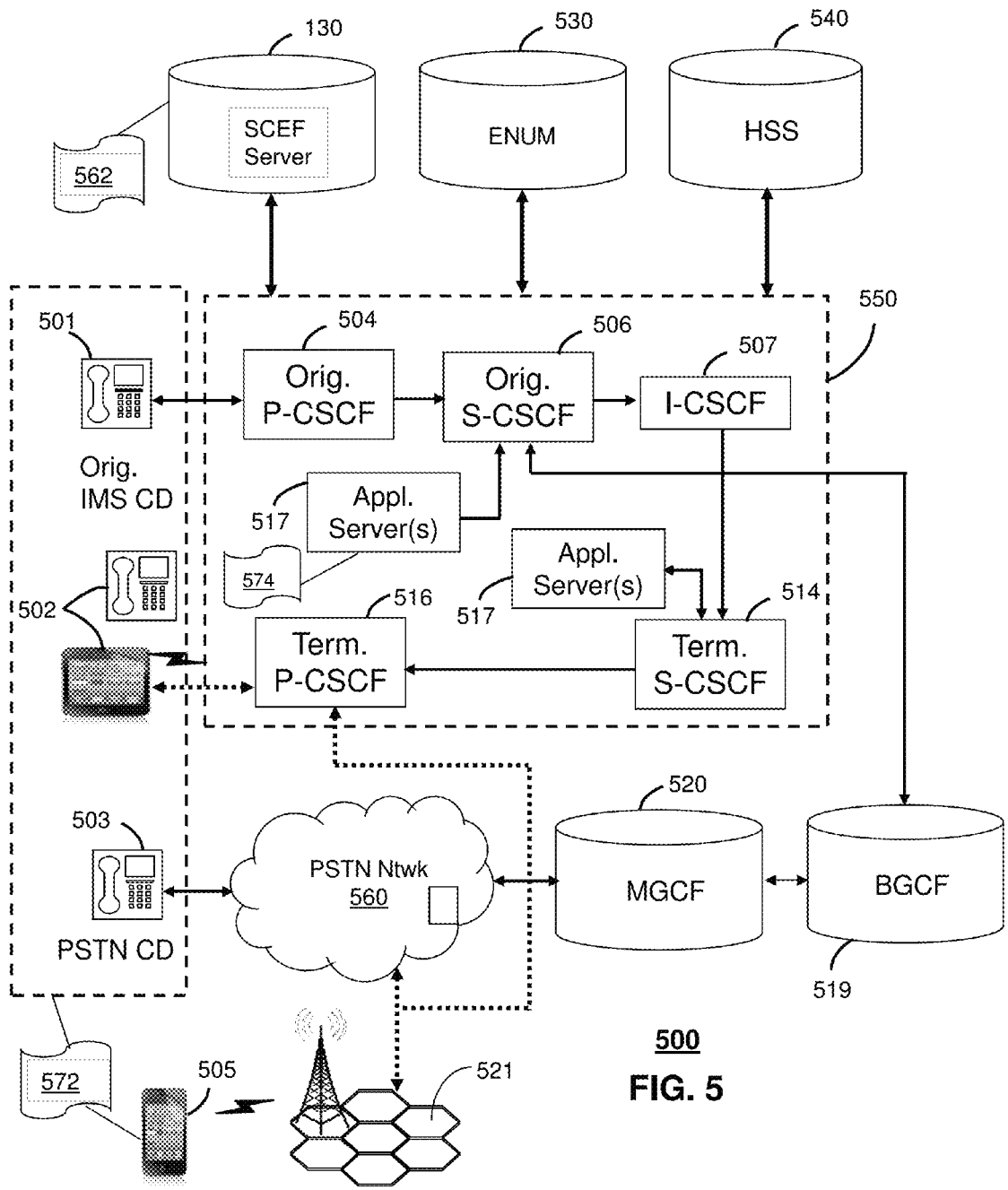
FIG. 5 depicts illustrative embodiments of a communication system that provides communication and media services for communication devices according to embodiments illustrated in FIGS. 1 and 3

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with systems 100 and 300 of FIGS. 1 and 3, as another representative embodiment of communication system 500 for providing a position estimate for an IoT device to an external server.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *62 forward calls, *63 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

A SLEC server 130 of FIG. 1 can be operably coupled to communication system 500 for purposes similar to those described above. SLEC server 130 can perform function 562 and thereby provide dynamic data path services to the CDs 501, 502, 503 and 505 of FIG. 5 similar to the functions described for SLEC server 130 of FIG. 1 in accordance with method 400 of FIG. 4. CDs 501, 502, 503 and 505, which can be adapted with software to perform function 572 to utilize the services of the SLEC server 130. SLEC server 130 can be an integral part of the application server(s) 517 performing function 574, as adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
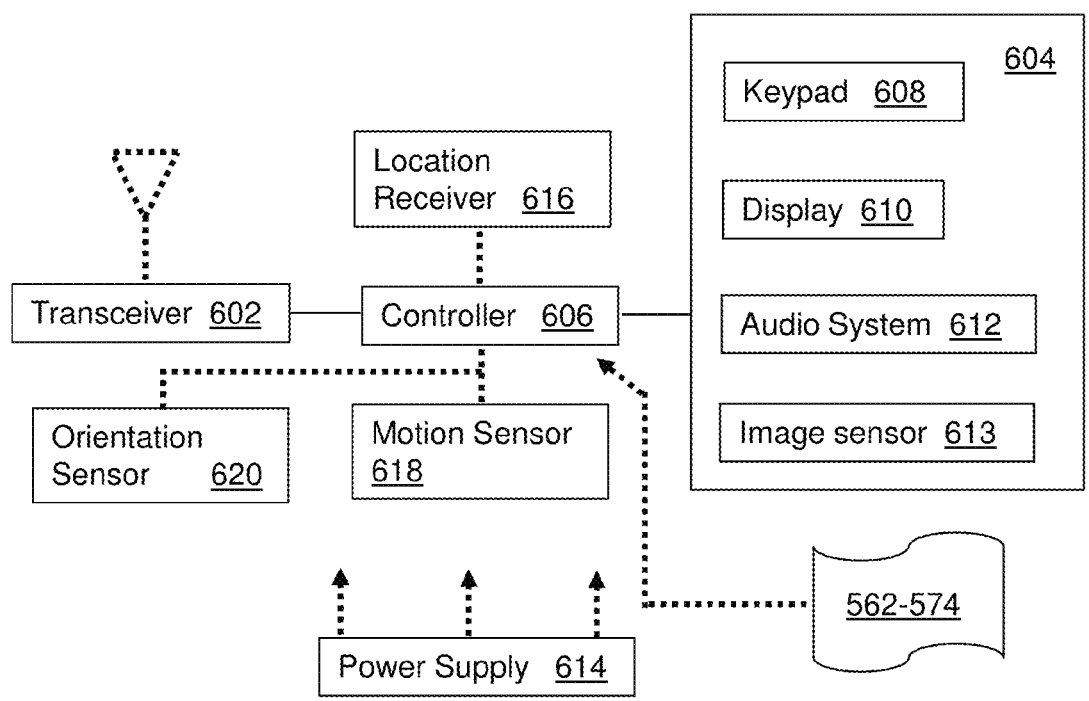
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1, 3, and 5, and can be configured to perform portions of method 400 of FIG. 4. Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure. The communication device 600 can be adapted to perform the functions of devices of FIGS. 1, 3, and 5, as well as the IMS CDs 501-502 and PSTN CDs 503-505 of FIG. 5. It will be appreciated that the communication device 600 can also represent other devices that can operate in systems 100, 300, and 500, of FIGS. 1, 3, and 5, communication system 500 of FIG. 5, such as a narrow band IoT device 116, and SLEC server 130. In addition, the controller 606 can be adapted in various embodiments to perform the functions 562-574, respectively.

Upon reviewing the aforementioned embodiments, it would be evident to an artisan with ordinary skill in the art that said embodiments can be modified, reduced, or enhanced without departing from the scope of the claims described below.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
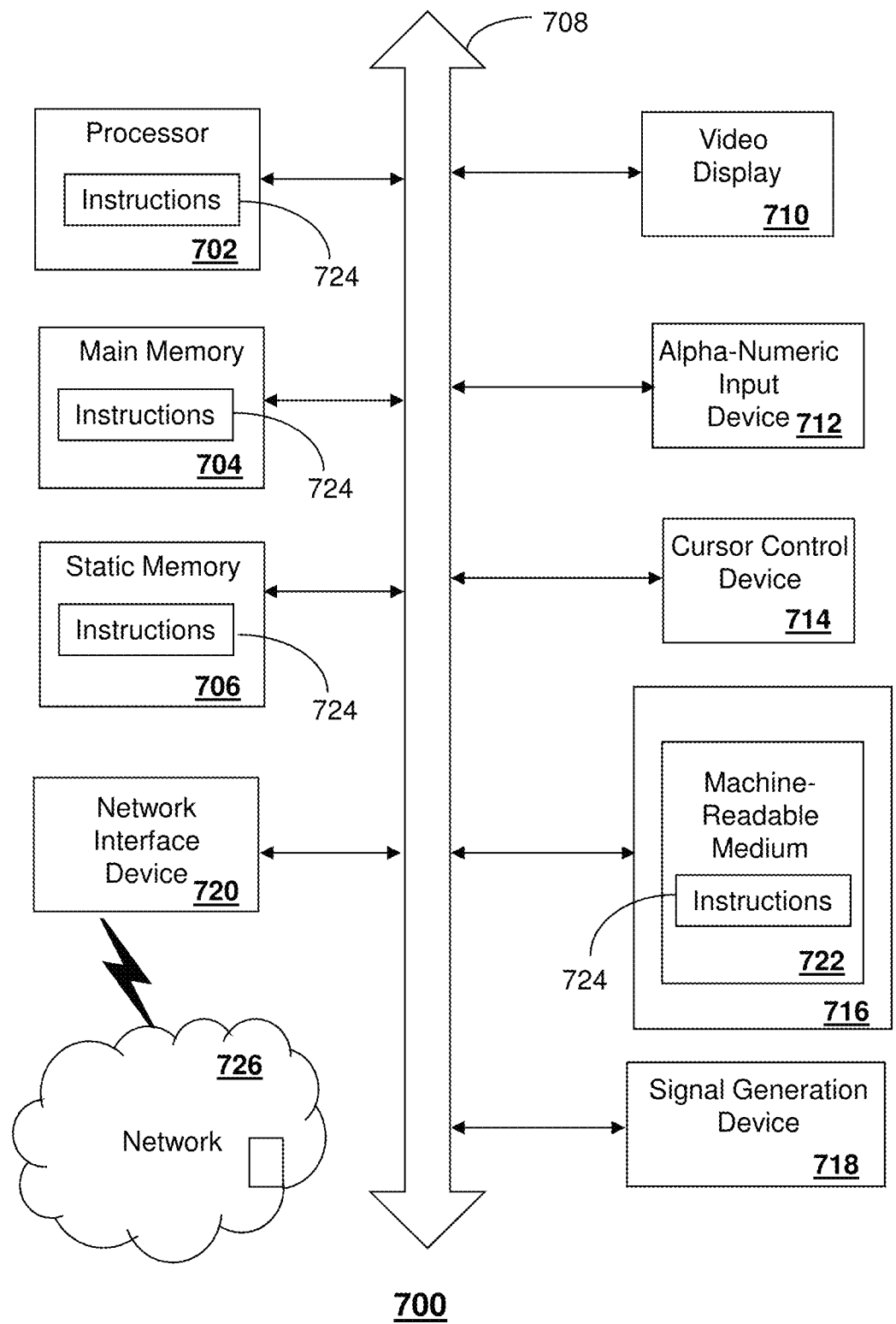
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the SLEC server 130, the NB-IoT devices 116, the GMLC 135, the MME 135, and the C-SGN 165, and other devices of FIGS. 1, 3, 5, and 6. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A service capability exposure function (SCEF) server, comprising:
    a processing system including a processor; and
    a memory that stores executable instructions that, when executed by the processing system, facilitate performance of operations, comprising:
        receiving, from an application server, a current location request associated with a narrow band Internet of Things (NB-IoT) device;
        determining a device identity of the NB-IoT device and a client type of the application server according to the current location request
        determining a location request priority of the current location request according to the device identity, the client type, or any combination thereof
        determining whether to send a location estimation trigger according to the location request priority of the current location request;
        responsive to determining to send the location estimation trigger,
            determining a position determination method according to the device identity, the client type, or any combination thereof; and
            transmitting a location estimation trigger request, including the device identity and the position determination method, to a gateway mobile location center (GMLC);
        receiving, from the GMLC, a terminated location estimation response including a position estimate, wherein the position estimate is determined at an enhanced serving mobile location center (ESMLC) according to the location estimation trigger request; and
        transmitting the position estimate for the NB-IoT device to the application server, wherein transmissions between the SCEF and the GMLC are via control plane signaling.

2. The SCEF server of claim 1, wherein the operations further comprise limiting new location estimation trigger requests according to a rate of location estimation trigger requests between the SCEF and the GMLC.

3. The SCEF server of claim 2, wherein the operations further comprise
    determining the rate of location estimation trigger requests by monitoring communication between the SCEF and the GMLC; and
    determining whether the rate of location estimation trigger requests exceeds a threshold, wherein the new location estimation trigger requests are limited responsive to the rate of location estimation trigger requests exceeding the threshold.

4. The SCEF server of claim 2, wherein the new location estimation trigger requests are limited according to a closed-loop feedback exchange between the SCEF and the GMLC.

5. The SCEF server of claim 1, wherein the operations further comprise determining whether the terminated location estimation response meets a quality metric for positioning of the NB IoT device, wherein the position estimate is transmitted to the application server responsive to determining that the position estimate meets the quality metric.

6. The SCEF server of claim 1, wherein the client type is determined to be emergency or operator services.

7. The SCEF server of claim 1, wherein transmissions between the SCEF and the GMLC are via Diameter interface.

8. The SCEF server of claim 1, wherein the operations further comprise:
    mapping the position estimate for the NB-IoT device to generate mapped position estimate; and
    transmitting the mapped position estimate to the application server.

9. The SCEF server of claim 1, wherein the GMLC transmits a terminated location estimation request to a home subscriber server (HSS) according to the location estimation trigger request.

10. The SCEF server of claim 9, wherein the GMLC receives a mobile management entity (MME) identity for the NB-IoT device from the HSS responsive to the terminated location estimation request.

11. The SCEF server of claim 1, wherein the GMLC transmits a terminated location estimation request to a mobile management entity (MME) according to an MME identity.

12. The SCEF server of claim 11, wherein the MME transmits a location services request to an enhanced serving mobile location center (ESMLC) according to a terminated location estimation request.

13. The SCEF server of claim 1, wherein an enhanced serving mobile location center (ESMLC) applies the position determination method to determine the position estimate for the NB-IoT device associated with the device identity.

14. The SCEF server of claim 13, wherein the ESMLC transmits a location services response including the position estimate to a mobile management entity (MME), and wherein the MME transmits the terminated location estimation response including the position estimate to the GMLC.

15. A non-transitory machine-readable storage medium, comprising executable instructions that, when executed by a processing system including a processor, facilitate performance of operations at a service capability exposure function server, comprising:
    receiving, from an application server, a current location request associated with a wireless communication device;
    determining a location request priority of the current location request according to a device identity of the wireless communication device, a client type of the application server, or any combination thereof;

determining whether to send a location estimation trigger according to the location request priority of the current location request; and responsive to determining to send the location estimation trigger, transmitting a location estimation trigger request, including the device identity and a position determination method to a location gateway;

receiving, from the location gateway, a terminated location estimation response including a position estimate, wherein the position estimate is determined at a mobile location server according to the location estimation trigger request; and transmitting the position estimate for the wireless communication device to the application server, wherein transmissions between the service capability exposure function server and the location gateway are via control plane signaling.

16. The non-transitory machine-readable storage medium of claim 15, wherein the operations further comprise limiting new location estimation trigger requests according to a rate of location estimation trigger requests between the service capability exposure function server and the location gateway, wherein the location gateway is a gateway mobile location center.

17. The non-transitory machine-readable storage medium of claim 15, wherein the operations further comprise determining the position determination method according to the device identity, the client type, or any combination thereof, and wherein the mobile location server is an enhanced serving mobile location center.

18. The non-transitory machine-readable storage medium of claim 15, wherein the operations further comprise determining whether the terminated location estimation response meets a quality metric for positioning of the wireless communication device, wherein the position estimate is transmitted to the application server responsive to determining that the position estimate meets the quality metric, and wherein the wireless communication device is a narrow band Internet of Things device.

19. A method, comprising:

receiving, from an application server and by a processing system including a processing device, a current location request associated with a wireless communication device;

transmitting, by the processing system, a location estimation trigger request including a device identity to a location gateway;

receiving, from the location gateway and by the processing system, a terminated location estimation response including a position estimate, wherein the position estimate is determined at a mobile location center according to the location estimation trigger request;

determining, by the processing system, whether the terminated location estimation response meets a quality metric for positioning of the wireless communication device; and transmitting, by the processing system, the position estimate for the wireless communication device to the application server responsive to determining that the position estimate meets the quality metric, wherein transmissions between the processing system and the location gateway are via control plane signaling.

20. The method of claim 19, further comprising:

determining, by the processing system, a location request priority of the current location request according to a device identity of the wireless communication device, a client type of the application server, or any combination thereof; and determining, by the processing system, whether to send a location estimation trigger according to the location request priority of the current location request, wherein the location estimation trigger request is transmitted responsive to determining to send the location estimation trigger, wherein the processing system is a service capability exposure function, the wireless communication device is a narrow band Internet of Things device, the location gateway is a gateway mobile location center, and the mobile location center is an enhanced serving mobile location center.

* * * * *